United States Patent [19]

Martenson

[11] Patent Number: 4,584,175
[45] Date of Patent: Apr. 22, 1986

[54] CORROSION INHIBITING METHOD AND PLASTIC SHEET MATERIAL THEREFOR

[76] Inventor: Irvin W. Martenson, 782 Shadow Grove Blvd., Brea, Calif. 92670

[21] Appl. No.: 609,636

[22] Filed: May 14, 1984

Related U.S. Application Data

[63] Continuation-in-part of Ser. No. 217,175, Dec. 16, 1980, Pat. No. 4,448,916.

[51] Int. Cl.$^4$ .................. C23F 11/00; C23F 11/02
[52] U.S. Cl. .................... 422/9; 252/315.2; 252/389 R; 252/390; 252/391; 252/392; 252/404; 422/8
[58] Field of Search .......... 252/389.2, 390, 391, 252/392, 404; 422/8, 9

[56] References Cited

U.S. PATENT DOCUMENTS

| | | | |
|---|---|---|---|
| 2,466,517 | 4/1949 | Blair, Jr. et al. | 252/392 X |
| 3,203,904 | 8/1965 | Brown | 252/392 |
| 3,336,229 | 8/1967 | Lutz | 252/392 X |
| 3,413,227 | 11/1968 | Howard et al. | 252/392 X |
| 3,531,409 | 9/1970 | Seffens et al. | 252/390 X |
| 4,130,524 | 12/1978 | Boerwinkle et al. | 252/392 X |
| 4,275,835 | 6/1981 | Miksic et al. | 252/392 X |

FOREIGN PATENT DOCUMENTS

| | | | |
|---|---|---|---|
| 996502 | 6/1965 | United Kingdom | 252/404 |

*Primary Examiner*—Richard D. Lovering
*Attorney, Agent, or Firm*—Robert E. Strauss

[57] ABSTRACT

There is disclosed a method for the inhibiting of corrosion of a variety of metals by placing the metal in the presence of a plastic sheet carrier having incorporated therein effective amounts of corrosion inhibitors which include; (a) certain hydroxyalkyl fatty amines, and (b) certain fatty imidazolinium quaternary compounds. The aforementioned compounds provide remarkable corrosion protection for ferrous metals. There can be also included in the plastic certain benzotriazoles or tolyltriazoles when it is desired to extend the protection to copper and copper base alloys, and to aluminum and aluminum base alloys. When protection is also desired for magnesium and magnesium alloys with other metals such as aluminum, there can also be included in the plastic sheet carrier an organic phosphate adduct with diethyl amine. In the preferred embodiment, the metal objects to be protected are sealed in an envelope formed of the plastic sheet material. In this application, extended shelf life and continued effectiveness of the corrosion inhibition can be achieved by also including in the plastic film a non-fugitive organic anti-oxidant, such as an aromatic phenol with sterically hindered hydroxyl groups.

The composition of the invention comprises a stable gel in which the aforementioned plastic additives are dissolved and/or suspended which can be used as a liquid carrier to dispense the aforementioned compounds into the plastic sheet or film during its formation. For this purpose, the aforementioned hydroxyalkyl fatty amines can be gelled, neat or dissolved with a plasticizer for the plastic, by the addition thereto of certain expanding lattice organophyillic clays.

14 Claims, No Drawings

CORROSION INHIBITING METHOD AND PLASTIC SHEET MATERIAL THEREFOR

RELATIONSHIP TO OTHER APPLICATIONS

This application is a continuation in part of copending application Ser. No. 217,175 filed Dec. 16, 1980, now U.S. Pat. No. 4,448,916, issued May 15, 1984.

BACKGROUND OF THE INVENTION

1. Field of Invention

This invention relates to a method and composition for inhibiting corrosion of a variety of metals and, in particular, to the inclusion of corrosion inhibitors and shelf life extenders in plastic sheet material useful for packaging of metal products.

2. Brief Statement of the Prior Art

The protection of metal surfaces with corrosion inhibitors has traditionally been achieved by applications of coatings of the corrosion inhibitors to the surfaces to be protected. This technique has shortcomings; it contaminates the metal surfaces, and many metal objects, such as delicate scientific instruments, can not be protected in this fashion.

Some limited success has been achieved in packaging metal objects in plastic film in which the corrosion inhibitor is incorporated in the film. These techniques have found only limited acceptance, however, since difficulties have been experienced when attempting to incorporate corrosion inhibitors in plastic and no single plastic film product has been developed which effectively inhibits corrosion of a wide variety of metals. Additionally, the plastic film containing the corrosion inhibitors has a limited shelf life since corrosion inhibitors must be used which have sufficient volatility to effect transferring to the metal surfaces after packaging, and the corrosion inhibitor is ultimately lost from the plastic film.

The attempts to incorporate the corrosion inhibitors in plastic films have used pellets of molding resin in which the corrosion inhibitors have been incorporated as the resin for the extrusion of the plastic film and sheet. The storing and handling of the pellets in which the corrosion inhibitors have been incorporated generates fines and dust and this dust presents inhalation toxicity problems to the workers as most corrosion inhibitors are potentially toxic. Also this technique requires a significant amount of cleaning and preparation of equipment, particularly since most of these corrosion inhibitors have specific activity for a limited number of metals and frequent changing of the molding resin is required.

Accordingly, there exists a need for a simple method to incorporate corrosion inhibitors in plastic sheet and film during extrusion. For this purpose a corrosion inhibitor concentrate should be supplied to the extrusion equipment as a stable liquid gel which can be metered into the plastic during the extrusion operation, thereby avoiding the potential inhalation toxicity problems as well as greatly simplifying the manufacturing technique. Additionally, a need exist for extending the shelf life of products packaged in the plastic film containing the corrosion inhibitors and for providing a single product which exhibits corrosion inhibition of a wide variety of metals including ferrous metals, aluminum and its alloys, copper and its alloys and magnesium base alloys.

BRIEF DESCRIPTION OF THE INVENTION

This invention includes: a method for inhibiting corrosion of a variety of metals; compositions including a plastic sheet carrier in which corrosion inhibitors and shelf life extenders have been incorporated for use in the method; and a stable liquid gel composition useful for incorporating the corrosion inhibitors and shelf life extenders in the plastic film during its extrusion.

The method for corrosion inhibition comprises placing, in the presence of the metal surface to be protected, a plastic sheet or film having incorporated therein an effective amount of certain hydroxyalkyl fatty amines and certain fatty imidazolinium quaternary compounds. In addition, the plastic film can also have incorporated therein certain benzotriazoles or tolyltriazoles, which are useful in inhibiting the corrosion of copper and aluminum and alloys of copper and aluminum. In a more preferred embodiment, an organic phosphate adduct with diethyl amine is also incorporated in the plastic sheet or film since this additive extends the corrosion protection to magnesium and its alloys.

Preferably, the method of the invention comprises enveloping the metal object to be protected with the aforementioned plastic sheet material or film. The resultant package is hermetically sealed. In this method it is also preferred to include in the plastic sheet material certain shelf life extenders which effectively prolong the corrosion inhibition. Useful additives for incorporating in the plastic sheet or film for this purpose are non-fugitive organic anti-oxidants, particularly polynuclear aromatics having sterically hindered hydroxyl groups.

The invention also comprises, as a composition of matter, the plastic sheet or film having incorporated therein the aforementioned corrosion inhibitors and shelf life extenders at concentrations which are effective in inhibiting corrosion, generally in amounts from about 0.01 to 5 weight percent each with a total additive concentration from about 0.1 to about 7 weight percent.

There is also disclosed a stable liquid gel composition which contains the aforementioned corrosion inhibitors and which is stable during storage and handling over prolonged periods of time. The gel composition has a viscosity and consistency such that it can be metered and injected into the plastic while the later is in a melted condition during its extrusion into sheet or film. For this purpose, the composition is gelled by an expanding lattice organophylic clay. The hydroxyalkyl fatty amines which are used in major proportions in this composition are liquid and can be gelled, neat, or can be mixed with a liquid plasticizer for the plastic, and this mixture can be gelled with the aforementioned organo clay. The resultant gel forms a very stable, thixotropic liquid carrier in which the other corrosion inhibitors and extenders can be incorporated, resulting in a very stable suspension which resists settling of any suspended solids over prolonged periods of storage and handling, thereby avoiding any necessity for mixing prior to use and the associated problems encountered during such mixing, such as inclusion of air bubbles and the like.

DESCRIPTION OF PREFERRED EMBODIMENTS

This invention comprises a method for inhibiting corrosion of a variety of metals by placing the metal in the presence of a plastic sheet or film in which there are incorporated certain corrosion inhibitors and shelf life extenders. The most common application of the method comprises packaging of metal objects in sealed enclosures formed of the plastic sheet or film such as sealed plastic bags or sealed plastic wrappings of the metal objects.

Various thermoplastic resins can be used for the plastic sheet or film. The invention is applicable to virtually all thermoplastic resins which can be extruded into flexible films. Examples of suitable plastic resins include the polyolefins such as polyethylene, polypropylene, and halogenated derivatives thereof; polyvinyl resins such as polyvinyl chloride, polyvinylidene chloride (Saran), polyester resins (Mylar), and Nylons and related hexamethylene diamine copolymers, polyethylene terephthalate, polybutylene terephthalate, etc.. The plastic resin is extruded or blown into sheets or films using conventional technology. Typically the films have a thickness from 1 to about 25 mils, preferably from about 2 to 10 mils.

The corrosion inhibitors and shelf life extenders are incorporated in the resin during the extrusion or blow molding of the resin into sheets and film. These additives are injected, in the form of a stable liquid gel or suspension, into the melted resin during the manufacture of the sheet or film. For this purpose, conventional liquid additive metering pumps are used such as that marketed by the RS Corcoran Company, New Lennox, Ill.

Ferrous metals are protected against corrosion when the plastic film has incorporated therein certain hydroxyalkyl fatty amines in amounts from about 0.03 to about 5 weight percent and certain fatty imidazolinium quaternary compounds in amounts from about 0.01 to about 3 weight percent.

The Fatty Amine Ingredient

The amines which are used in the liquid gel composition mixture are hydroxyalkyl long chain aliphatic (fatty) amines having the following formula:

$$(OHR_1)_n-NH_{(2-n)}-R_2$$

wherein:
$R_1$ is a $C_1$ to $C_8$ alkylene such as methylene, ethylene, propylene, butylene, pentylene, octylene, etc.;
$R_2$ is a $C_{10}$ to $C_{22}$ aliphatic group such as decyl, oleyl, palmityl, stearyl, myristyl, linaleyl, etc.; and
n is 1 or 2.

These compounds are commonly derives from animal and vegetable fats and oils and are accordingly referred to by source, e.g., hydroxyalkyl derivatives of coco amine, tallow amine, etc.

Suitable compounds are N-hydroxyethyl coco amine, N,N-bis-hydroxyethyl coco amine, N,N-bis-hydroxyethyl tallow amine, hydroxypropyl oleylamine, N,N-bis-hydroxybutyl linoluylamine, etc. The preferred class of these compounds are the N,N-bis-compounds, wherein n is equal to 2, in the above formula.

The Imidazolinium Quaternary Ingredient

The imidazolinium quaternaries which are used in the liquid gel composition have the general formula:

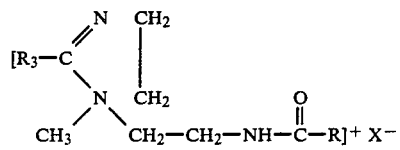

wherein:
$R_3$ is a $C_{10}$ to $C_{22}$ aliphatic group such as decyl, oleyl, palmityl stearyl, myristyl, linoleyl, etc.; and
X is $C_1$ to $C_5$ alkyl sulfate such as methyl sulfate, ethyl sulfate, propyl sulfate, isopropyl sulfate, etc., such as methyl sulfate, ethyl sulfate, propyl sulfate, isopropyl sulfate, etc.

Examples of suitable compounds in this class are:
methyl-1-hydrogenated tallow amido ethyl-2-hydrogenated tallow imidazolinium-methyl sulfate:
methyl-1-oleyl amido ethyl-2-oleyl imidazolinium-methyl sulfate; and
1-ethylene bis (2-tallow, 1-methyl, imidazolinium methyl sulfate).

The aforementioned amines and quaternaries are employed in proportions of from 70 to 90 weight percent amine and from 10 to 30 weight percent quaternary.

The Antioxidant

As previously mentioned, the preferred method comprises enclosing or enveloping the metal article in a bag or envelope which is formed entirely of the plastic sheet or film. With this application, the shelf life of the packaged metal product can be greatly extended by also incorporating in the plastic resin during the formation of the sheet or film a non-fugitive, organic, antioxidant. Various antioxidants can be used, however, those having a low vapor pressure are preferred to minimize the lose of the antioxidant from the plastic sheet or film. Examples of suitable antioxidants include phenol derivatives, particularly those having sterically hindered hydroxyl groups such as 2,6-ditertiarybutyl phenol and alkyl substituted derivatives, e.g., 2,6-ditertiarybutyl cresol, etc. While these can be used, it is preferred to use less volatile derivatives of these compounds. In general, the useful antioxidants which are based on these compounds have the following formula:

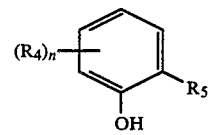

wherein
$R_4$ is a $C_1$ to $C_8$ alkyl or isoalkyl group;
$R_5$ is a $C_2$ to $C_8$ alkylene, or carboxyalkyl, or a $C_2$ to $C_6$ glycol ester thereof i and n is 1 or 2.

These compounds include the aforementioned ditertiarybutyl phenol and the more preferred, higher molecular weight derivatives, such as bis-[3,3-bis(4'hydroxy-3'tertiarybutyl-phenyl)-butanoic acid]-glycol ester; 2,2-bis[[3-[3,5-bis(1,1-dimethylethyl)-4-hydroxyphenyl]-1-oxopropoxy]methyl]-1,3-propanediyl 3,5-bis(1,1-dimethylethyl)-4-hydroxybenzenepropanoate; 2,2'-oxamido bis-[ethyl 3-(3,5-ditertiarybutyl-4-hydroxyphenyl)]propionate.

Other antioxidants which can be used as an organic, nonfugative antioxidant in the plastic sheet or film include phosphites of alkyl substituted aromatics such as tris(nonylphenyl)phosphite, and polypropylene glycol esters thereof.

The Copper Corrosion Inhibitors

When the metal article also has copper surfaces and it is desired to protect those surfaces against corrosion, the plastic sheet or film has incorporated therein aromatic triazoles of the following general formula;

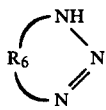

wherein: $R_6$ is benzylene, naphthylene and $C_1$ to $C_6$ alkyl substituted benzylene and naphthylene groups. Examples include benzotriazole, tolyltriazole, naphthyltriazole, etc.

Another useful class of compounds which can be used as corrosion inhibitors for copper and copper containing alloys includes bis-aromatic hydrazides, e.g., oxalyl bis-(benzylidene hydrazide), succinyl bis-(benzylidene hydrazide), etc.

The Magnesium/Aluminum Corrosion Inhibitor

Magnesium and aluminum alloys can also be protected against corrosion by the inclusion in the plastic sheet or film of an effective amount of an organic phosphate adduct with diethyl amine. The organic phosphate can be any of the various alkanol esters of ortho phosphoric acid which readily combined or a form adducts with the diethyl amine. Examples of such esthers include the mono-, di- and tri-ethyl phosphate, dimethyl phosphate, tripropylphosphate, etc.. This additive is used at concentrations from about 0.01 to about 3 weight percent based on the weight of the resin in the plastic sheet or film.

The invention also comprises the composition of a thermoplastic resin containing therein the aforementioned quantities of corrosion inhibitors and shelf life extenders. The following table summarizes the various ingredients and concentrations of each ingredient in the plastic sheet and film of the invention:

TABLE 1

| Plastic Film Ingredient | Broad Weight Percent | Preferred Weight Percent |
| --- | --- | --- |
| Thermoplastic Resin | 92-99.9 | 95-98 |
| Fatty Amine | 0.05-5 | 0.5-3 |
| Imidazolium quaternary | 0.01-3 | 0.1-2 |
| Plasticizer | 0-5 | 0-3.5 |

Optional Resin Additives

There may also be included in the plastic sheet or film various pigments, ultraviolet light stablizers, and other specialty ingredients to impart specialized properties to the plastic sheet or film. These are all ingredients or additives which are customarily used and incorporated in the plastic sheet or film which is conventionally manufactured for packaging purposes and these materials can be readily included in the plastic sheet or film of the invention, preferably by incorporating these additives in the stable liquid gel or suspension composition which serves as the liquid vehicle for the corrosion inhibitors and shelf life extender.

The Organoclay Additive

The plastic sheet and film will also contain, as an inert material, an organophyllic, expanding lattice clay. This ingredient is utilized to form a stable gel and gel suspension of the various anti-corrosion ingredients to permit these ingredients to be stored and handled as concentrate compositions and to permit such concentrate compositions to be accurately metered into the resin during the manufacture of the plastic sheet or film. Typically, the organophylic clay will be present in an amount from about 1 to about 5, preferably from about 2 to about 3, weight percent of the total amount of the anti-corrosion additives and shelf life extender.

The mixture of the aforementioned amines and imidazolinium quaternaries can be formed into a gel by incorporating an organophyllic clay into the liquid mixture under high shear conditions. Useful clays are swelling or expanding lattice clays such as found in Wyoming, South Dakota, Montana, Utah, Nevada and California. These expanding lattice clays include montmorillonite, vermiculite, nontronite, saponite, hectorite, etc., all having a three layer crystal. These clays are commonly found in admixture in bentonite clays having an average aluminum oxide content less than about 20 weight percent. The bentonite clays also have a high ion exchange capacity, commonly between about 50 and 150 milliequivalents, per 100 grams of the air-dried clay.

The aforedescribed clays are usually found in a form wherein the ion exchange sites are occupied with alkali and/or alkaline earth metals. The clays can be ion exchanged with an alkyl ammonium compound to form the organophyllic clay or can be treated to exchange the alkali or alkaline metals with hydrogen and the resultant hydrogen substitution is accomplished simply by acid washing the solid clay using a dilute mineral acid such as hydrochloric, nitric or sulfuric acid, and separating the solid from the acid by settling or filtering. A suspension of the clay can also be converted to the hydrogen form by passing the suspension over a hydrogen charged ion exchange solid such as Amberlite and the resultant aqueous suspension of hydrogen clay can be reacted with the alkylamine. The organophyllic clays are also commercially available from a number of sources, one class is designated as Bentone, available from National Lead Company.

The alkylammonium groups which are ion exchanged onto the clay can be mono, di, tri or tetra-alkyl ammonium ions wherein the alkyl groups have from one to about twelve carbons. Examples of suitable ammonium ions for perparation of an organophyllic clay are tetramethyl ammonium ion, 2-ethylhexyl ammonium ion, triethyl ammonium ion, dioctyl ammonium ion, tetrabutyl amminium ion, etc.

The organophyllic clay is employed in a finely subdivided state, typically in a powder form having a particle diameter passing a 20 mesh and retained on about 325 mesh Standard screen.

The Liquid Gel Composition

This invention also comprises a liquid gel composition of a mixture of the hydroxyalkyl fatty amines and fatty imidazolinium quaternaries which can be used to incorporate these ingredients in the plastic sheet or film during its extrusion, and which is stable and resistant to changes in viscosity. This composition can also include liquid plasticizers in the liquid gel, when desired, as an additional liquid vehicle. Plasticizers are not preferred ingredients, since the gel composition appears to be more effective at lower concentrations in the extruded sheet or film when it is prepared without any plasticizer. In some specialized applications, however, it may be desirable to include a plasticizer in the gel composition. The plasticizer is a liquid which is compatible with molding resins and inert under the molding and injection conditions. The liquid plasticizer should be stable in the resin, resistant to weeping from the resin, resistant to weathering and solvent attack. Suitable plasticizers are esters of saturated mono- or di-basic alcohols, having from 2 to about 20 carbons with di- or tri-basic saturated aliphatic or aromatic acids or phosphoric acids. Examples of suitable alcohols are ethylene glycol, propylene glycol, hexamethylene glycol, etc. Examples of suitable monoalcohols include hexanol, amyl alcohol, octanol, isononanol, 2-ethylhexanol, etc.

The aforementioned mono- or di-basic alcohols are esterified with a di- or tri-basic saturated or aromatic acid or phosphoric acid. Examples of suitable acids include the alpha, omegaaliphatic acids, e.g., oxalic, succinic, adipic, pimelic, suberic, azelaic acids, etc and other aliphatic dicarboxylic acids such as 2,5-octanedioic acid, 1,3-heptanedoic acid, etc. Suitable dicarboxylic aromatic acids include phthalic, isophthalic, terephthalic, benzoic, methylbenzoic, trimellitic acid, etc. Di and trialkyl esters of phosphoric acid can also be used.

Examples of useful plasticizers include commercially available products such as dioctyl adipate, di-2-ethyl hexyl azelate, ethylene glycol dibenzoate, dilauryl phosphate, trihexyl phosphate, dioctyl phthalate, diisodecyl phthalate, diphenyl phthalate, dioctyl terephthalate, etc.

The gel composition can include various optional ingredients such as pigments and resin additives for special properties, such as ultraviolet light stabilizers, strengthening agents, etc.

The major ingredients of the liquid gel composition are set forth in the following Table:

TABLE 2

| Liquid Gel Ingredient | Broad Weight Percent | Preferred Weight Percent |
| --- | --- | --- |
| Amine | 70–90 | 75–85 |
| Imidazolinium quaternary | 10–30 | 15–25 |
| Organoclay | 0.1–10 | 0.2–3 |
| Plasticizer | 0–50 | 0–35 |

When the pigments or specialized additives are incorporated in the liquid gel composition, they can be added in amounts up to relatively high concentrations as set forth in the following Table:

TABLE 3

| Liquid Gel Ingredients | Broad Weight Percent | Preferred Weight Percent |
| --- | --- | --- |
| Basic Gel (Table 1) | 35–100 | 50–100 |
| Pigment | 0–70 | 0–35(1) |
| Resin Modifiers | 0–20 | 0–15 |

Preparation of the Gel Composition

The powdered organophyllic clay is mixed with the liquid mixture of amines and other corrosion inhibitors, and shelf life extender, e.g., the imidazolinium quaternary compound in the desired proportions and the resulting mixture is subjected to high shear forces, preferably by passing the mixture through a conventional blending mill. During the milling of the mixture, it will be observed that the viscosity of the mixture increases, reflecting the formation of a gel. The resultant gel is milled for sufficient time to raise its viscosity to the desired value that is compatible with the high pressure injection metering pumps used with molding, extruding or pelletizing equipment. These pumps typically require a liquid having a viscosity from about 3,000 to 15,000 centipoise seconds.

In instances when the resin is to be colored, a pigment can also be included in the liquid gel composition, thereby providing a single composition which imparts color and corrosion inhibition to the plastic sheet or film. When pigments are to be added to the liquid gel, the mixture of the clay and the aforementioned ingredients is not milled to its maximum viscosity but, instead, the milling operation is interrupted when the viscosity of the mixture reaches a value from about 1,000 to 3,000 centipoise seconds, Brookfield. The resultant gel is thereafter blended with the pigments to be employed in the liquid gel composition.

The following table summarizes the preferred composition of the invention which contains inhibitors for a wide variety of metals and which contains a shelf life extender for the corrosion inhibition.

TABLE 4

| Liquid Gel Ingredient | Broad Weight Percent | Preferred Weight Percent |
| --- | --- | --- |
| Amine | 40–80 | 60–75 |
| Imidazolinium quaternary | 3–10 | 4–7 |
| Aromatic triazole | 10–20 | 12–15 |
| Organoclay | 1–5 | 2–3 |
| Antioxidant | 1–5 | 2–3 |
| Phosphate/amine adduct | 3–10 | 4–7 |

The following examples will serve to illustrate a mode of practice of the invention and to demonstrate results obtainable thereby.

EXAMPLE 1

A liquid gel composition is prepared by blending together 287 weight parts of N,N-bis-hydroxyethyl coco amine, 112 weight parts of N,N-bis-hydroxyethyl tallow amine, 75 parts by weight of methyl-1-hydrogenated tallow amido ethyl-2-hydrogenated tallow imidazolinium-methyl sulfate, 300 parts by weight of dioctyl phthalate, and 4 parts by weight of Bentone 38, a commercially available tetra-alkyl ammonium smectite. These ingredients are thoroughly mixed on a mill to a viscosity of approximately 5,000 centipoise seconds, Brookfield. The resultant gel is extremely stable and can be stored for long periods of time without any appreciable changes in its viscosity.

The liquid gel composition is injected into admixture with Nylon resin during extrusion of the resin into film having a thickness of 0.005 inch. The resultant film is tested for corrosion prevention of steel plugs using Federal Test Method Standard No. 101C. In the test, small strips (2 inches by 8 inches) of the Nylon film were exhausted by suspending them for twelve days in a stream of 50% relative humidity air flowing at a rate of 100 cubic centimeters per minute, at 140° F.

Steel plugs were prepared from a ⅜ inch diameter rod of cold-rolled low carbon steel. The plugs were ½ inch long, with a small hole drilled in the center of one end. The surface of the undrilled end of each plug was polished and the plugs were washed with mineral spirits and hot methanol and air dried. The steel plugs were then placed into 6 inch long tubes of polyvinyl chloride, with the polished ends exposed. The tubes were each mounted with two 1 inch by 6 inches strips of the exhausted Nylon film in sealed containers which also contained glycerin-water solutions effective to maintain 90% relative humidity. A third steel plug, similarly treated and mounted was placed in a third sealed container as a control sample.

All three containers were maintained at 73° F. After 20 hours, a water/ice mixture was poured into each tube to effect condensation on the polished ends of the steel plugs. Three hours, thereafter, each plug was inspected for corrosion.

The control plug exhibited light surface staining and an etched area 0.025 inch in diameter, which could not be removed with light polishing with silicon carbide paper. Both test samples exhibited light stains which was removed with light polishing.

The test strips of the Nylon containing the hydroxyalkyl fatty amine and fatty imidazolinium quaternary compound inhibited the corrosion of the mild steel plugs.

EXAMPLE 2

Another liquid gel composition is prepared by blending together 300 weight parts of N,N-bis-hydroxyethyl coco amine, 115 weight parts of N,N-bis-hydroxyethyl tallow amine, 75 parts by weight of methyl-1-hydrogenated tallow amido ethyl-2-hydrogenated tallow imidazolinium-methyl sulfate, 100 parts by weight of benzotriazole, and 4 parts by weight of Bentone 38, a commercially available tetra-alkyl ammonium smectite. These ingredients are thoroughly mixed on a mill to a viscosity of approximately 3,700 centipoise seconds, Brookfield. The gel is injected in admixture with Nylon resin during extrusion of the resin into film having a thickness of 0.006 inch.

The Nylon film is tested for corrosion inhibition of steel, copper and aluminum plugs using the test procedure described in the preceding example. It is observed that the film strips effectively inhibit the corrosion of the steel and copper and exhibit some inhibition of aluminum corrosion.

EXAMPLE 3

Example 2 is repeated, however, there is also included in the gel composition, 12 parts by weight of bis-[3,3-bis(4'hydroxy-3'tertiarybutyl-phenyl)-butanoic acid]-glycol ester. The Nylon film which is prepared containing 2 weight percent of the gel composition is tested for shelf life corrosion resistance against a control sample using the film prepared in Example 2. In this test, the metal parts are entirely enclosed in a sealed bag formed of the Nylon film samples. It is observed that the presence of the antioxidant incorporated in the Nylon in this experiment greatly extended the shelf life of the corrosion resistance of the Nylon samples.

EXAMPLE 4

In this experiment, the preferred gel composition is prepared by blending together 574 weight parts of N,N-bis-hydroxyethyl coco amine, 101 weight parts of N,N-bis-hydroxyethyl tallow amine, 45 parts by weight of methyl-1-hydrogenated tallow amido ethyl-2-hydrogenated tallow imidazolinium-methyl sulfate, 120 parts by weight of benzotriazole, 45 parts by weight of Virco-Pet 40, an adduct of diethyl amine and orthophosphoric acid, and 24 parts by weight of Bentone 38, a commercially available tetraalkyl ammonium smectite. An ultraviolet light stabilizer for the resin, 2,hydroxy-4-methoxy-benzophenone, is also admixed into the gel composition in an amount of 45 weight parts. The ingredients are thoroughly mixed on a mill to a viscosity of approximately 7,000 centipose seconds, Brookfield. The gel is injected in admixture with Nylon resin during extrusion of the resin into film having a thickness of 0.004 inch.

The Nylon resin is tested using the test procedure described in Example 1 for corrosion inhibition of mild steel, aluminum, magnesium and copper. It is observed that the Nylon resin is effective in inhibiting corrosion for all four metals.

Substantially the same results for corrosion inhibition are observed when the aforementioned gel compositions are incorporated in other resins, including polyethylene, polypropylene, polyethylene-terephthalate, and polybutylene terephthalate. In these resins, the gel composition is incorporated at the same proportions as for Nylon, from about 0.1 to about 8 weight percent, preferably from about 2 to about 5 weight percent.

The invention has been described with reference to the presently preferred embodiment. It is not intended that the invention be unduly limited by this disclosure of the presently preferred embodiment. Instead, it is intended that the invention be defined by the compositions, ingredients, steps, and their obvious equivalents, set forth in the following claims.

What is claimed is:

1. A method for the inhibition of corrosion of ferrous metals which comprises: placing an object formed of a ferrous metal in a closed container in the presence of a thermoplastic resin containing an effective amount, from about 0.1 to about 8 weight percent of a corrosion inhibitor additive comprising the following:
   (a) a fatty hydroxyl amine in an amount constituting from about 70 to 90 percent of the additive and having the following formula:

wherein:
   $R_1$ is a $C_1$ to $C_8$ alkylene;
   $R_2$ is a $C_{10}$ to $C_{22}$ aliphatic group; and
   n is 1 or 2;
   (b) a fatty imidazolinium quaternary in an amount from 10 to about 30 percent of the additive and having the following formula:

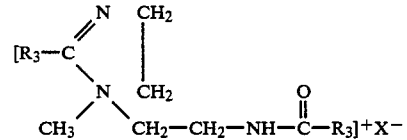

wherein:
   $R_3$ is a $C_{10}$ to $C_{22}$ aliphatic group; and
   X is $C_1$ to $C_5$ alkyl sulfate.

2. The method of claim 1 wherein said container is formed of a film of said resin.

3. The method of claim 2 wherein said resin also contains from 0.01 to about 1.0 percent of a non-fugitive organic antioxidant.

4. The method of claim 3 wherein said non-fugitive organic antioxidant is a high molecular weight aromatic having sterically hindered hydroxyl groups.

5. The method of claim 4 wherein said antioxidant has the following general formula:

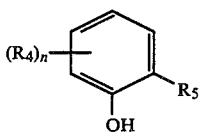

wherein:
R$_4$ is a C$_1$ to C$_8$ alkyl or isoalkyl group;
R$_5$ is a C$_2$ to C$_8$ alkylene, or carboxylalkyl, or a C$_2$ to C$_6$ glycol ester thereof; and
n is 1 or 2.

6. The method of claim 5 wherein R$_5$ is alkylene.

7. The method of claim 6 wherein said antioxidant is bis-[3,3-bis(4'hydroxy-3'tertiarybutyl-phenyl)-butanoic acid]glycol ester.

8. The method of claim 1 wherein said object is also formed of copper, aluminum, or mixtures thereof, and said resin also contains from 0.01 to about 2 percent of a triazole having the general formula:

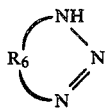

wherein R$_6$ is selected from the group consisting of benzylene, naphthylene, and C$_1$ to C$_6$ alkyl substituted benzylene and naphthylene groups.

9. The method of claim 1 wherein said metal object is also formed of magnesium and its alloys and said resin contains from 0.01 to about 3 percent of an orthophosphate adduct of diethyl amine, effective to inhibit the corrosion of magnesium and its alloys.

10. A thermoplastic resin having uniformly dispersed therein from 0.1 to about 8 weight percent of metal corrosion inhibitor additives consisting essentially of:
(a) a fatty hydroxyl amine in an amount constituting from about 70 to 90 percent of the additive and having the following formula:

(OHR$_1$)$_n$—NH$_{(2-n)}$—R$_2$ wherein:
R$_1$ is a C$_1$ to C$_8$ alkylene:
R$_2$ is a C$_{10}$ to C$_{22}$ aliphatic group; and
n is 1 or 2;
(b) a fatty imidazolinium quaternary in an amount from 10 to about 30 percent of the additive and having the following formula:

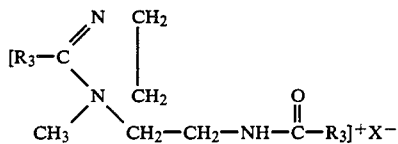

wherein:
R$_3$ is a C$_{10}$ to C$_{22}$ aliphatic group; and
X is C$_1$ to C$_5$ alkyl sulfate; and
(c) from 1 to about 5 percent of a non-fugitive organic antioxidant.

11. The resin of claim 10 wherein said non-fugitive organic antioxidant is a high molecular weight aromatic having sterically hindered hydroxyl groups.

12. The resin of claim 11 wherein said antioxidant has the following general formula:

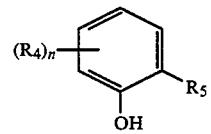

wherein:
R$_4$ is a C$_1$ to C$_8$ alkyl or isoalkyl group;
R$_5$ is a C$_2$ to C$_8$ alkylene, or carboxylalkyl, or a C$_2$ to C$_6$ glycol ester thereof; and
n is 1 or 2.

13. The resin of claim 12 wherein said antioxidant is bis-[3,3-bis(4'hydroxy-3'tertiarybutyl-phenyl)-butanoic acid]-glycol ester.

14. The resin of claim 10 also including an effective amount of an aromatic triazole having the formula:

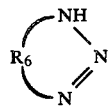

wherein R$_6$ is selected from the group consisting of benzyl, naphthyl, and C$_1$ to C$_6$ alkyl substituted benzyl and naphthyl.

* * * * *